Aug. 15, 1950  T. B. GIBBS  2,518,770
FOUNTAIN PEN
Filed May 1, 1946

INVENTOR
THOMAS B. GIBBS
BY
R. G. Richardson
ATTY.

Patented Aug. 15, 1950

2,518,770

UNITED STATES PATENT OFFICE 2,518,770

FOUNTAIN PEN

Thomas B. Gibbs, Delavan, Wis., assignor to The George W. Borg Corporation, Chicago, Ill., a corporation of Delaware Application May 1, 1946, Serial No. 666,330

6 Claims. (Cl. 120—42.4)

The present invention relates in general to fountain pens and more in particular to fountain pens of the ball point type. The object of the invention is a new and improved pen of this character which is highly efficient, durable, and inexpensive to manufacture.

The various features of the invention will be described in detail in the ensuing specification, with reference to the accompanying drawing, in which—

Figure 1:
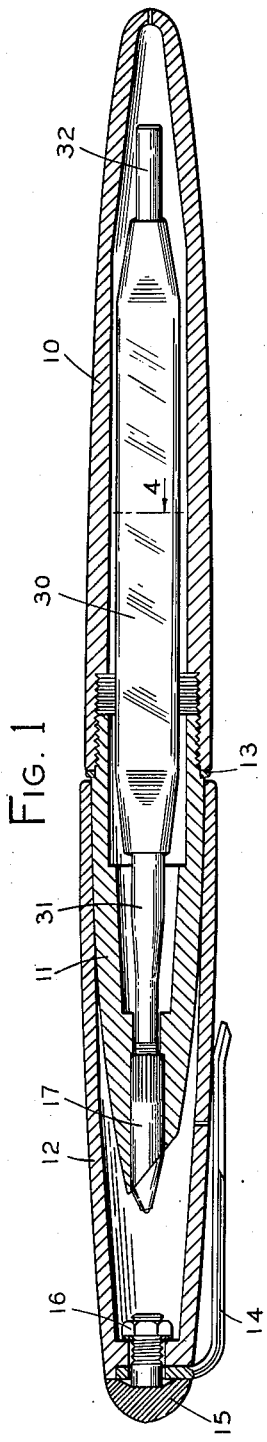
Fig. 1 is a cross-section of a complete fountain pen embodying the invention.
Figure 2:
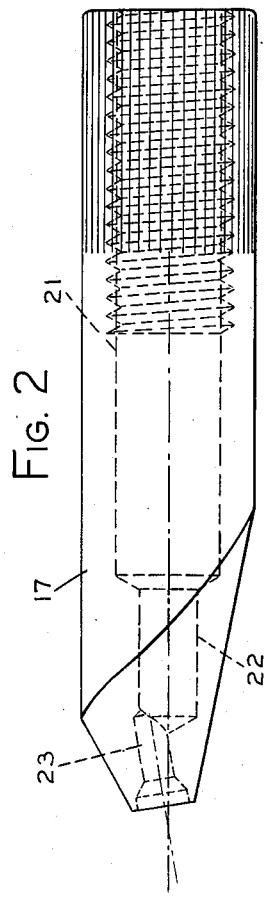
Fig. 2 is a side view of the ball retainer.
Figures 3, 4:
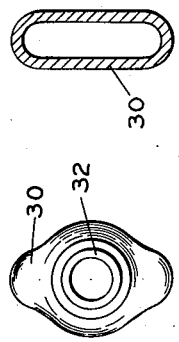
Fig. 3 is an end view of the ink cartridge.
Fig. 4 is a section through the ink cartridge on the line 4, Fig. 1.

The parts are shown on a scale of 2 to 1 in Fig. 1. In Fig. 2 the scale is 10 to 1, in Figs. 3 and 4 the scale is 4 to 1, and in Figs. 5 and 6 the scale is 40 to 1.

Referring to Fig. 1, the barrel 10, the housing 11, and the cap 12 may be molded of suitable plastic material and are shaped as shown in the drawing. The housing 11 is threaded into the barrel 10, the metal ring 13 being clamped between the end of the barrel and a shoulder on the housing. The cap 12 has a close fit on the housing 11 and may be pressed on as far as the ring 13, where it is normally held by friction. The cap is provided with a clip 14, which is secured to the end of the cap by means of the spherical headed screw 15 and the nut 16.

The reference character 17 indicates the ball retainer, which is carried in the housing 11. The ball retainer has a press fit in the housing, from which it projects as shown in Fig. 1, and preferably has a knurled portion at the right hand end which makes for a secure connection between the parts and eliminates any danger of the ball retainer rotating in the housing.

The ball retainer may be machined from a hard variety of brass rod, although it could be made of stainless steel or other suitable material. It comprises a cylindrical section and a conical tip the axis of which makes an angle of about 8 degrees with the axis of the cylindrical section. The conical tip is, moreover, offset with reference to the cylindrical section, and in the illustrated embodiment of the invention the axes intersect at a point beyond the ball 18. This is shown clearly in Fig. 5, where the dotted line 19 is the axis of the conical tip and the dotted line 20 is the axis of the cylindrical section. Due to the angular and offset location of the conical tip with respect to the cylindrical section, the junction of these parts, or the base of the conical tip, substantially defines a plane which makes an acute angle with the axis of the cylindrical section. In the pen shown, this angle is about 45 degrees. The end of the housing 11 is cut off or formed with the same angle, so that when the ball retainer is assembled in the housing only the conical tip is exposed.

The described construction of the ball retainer overcomes an objection to prior ball pointed pens, which have to be held in a fairly upright position in order to insure contact between the ball and the paper. Our improved pen may be held in the natural position, at a considerable angle to the paper, the same as is customary with an ordinary pen or pencil.

The bores 21 and 22, shown in dotted lines in Fig. 2, are co-axial with the cylindrical section of the ball retainer and the former is threaded to receive the ink cartridge. The bore or ink channel 23 is co-axial with the conical tip and terminates in a ball receiving recess which will be described in connection with Figs. 5 and 6.

This ball recess is defined by a short cylindrical wall 24, which is slightly larger in diameter than the ball 18, and a tapered wall 25 which connects with the ink channel 23. The ball 18 has an annular bearing against the tapered wall 25 and is retained in the recess by a lip 26 of reduced diameter at the end of wall 24, produced by a spinning operation.

Figure 5:
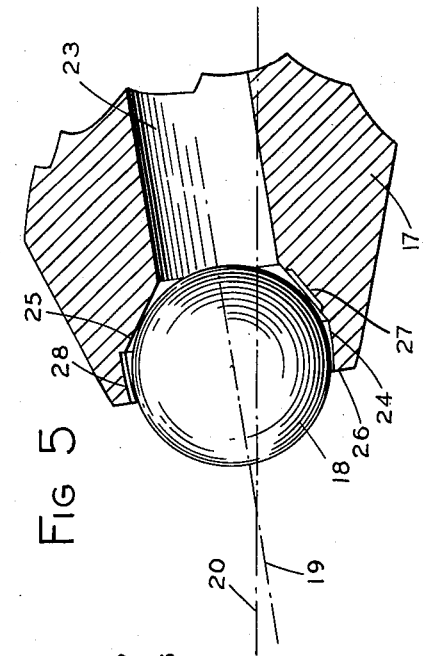
Fig. 5 is a cross-section through the tip of the ball retainer on the line 5—5, Fig. 6.
Figure 6:
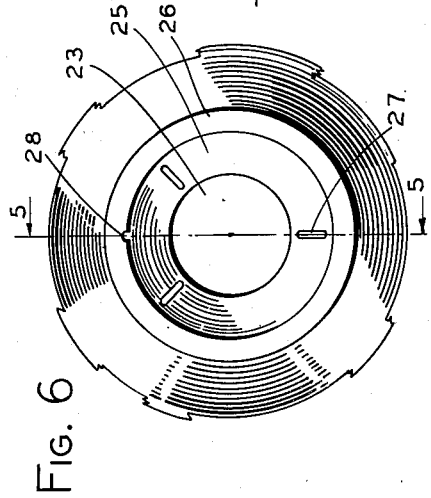
Fig. 6 is an end view of the ball retainer with the ball removed.

The bearing or seat for the ball 18 on the tapered wall 25 is intersected by a plurality of radial grooves such as 27, which provide channels for the flow of ink past the bearing. There is also a channel 28 which intersects the lip 26, which is povided to insure ample ink feed on the up stroke of the pen. In explanation of this, it may be stated that the ball rotates in a counter-clockwise direction, as seen in Fig. 5, on the up stroke and is in engagement with the upper part of the lip 26, due to the pressure on the paper, with the result that the lip tends to scrape the ink off the ball and thus interfere with the regular ink feed that would otherwise be produced by rotation of the ball. This difficulty is obviated by the channel 28. No corresponding channel on the lower side is required, because of the slight clearance between the ball and the lip 26. The ball engages the upper part of the lip on the down stroke as well as on the up stroke.

The ink cartridge comprises a tube 30, which may be made of brass or other suitable material which is wet by the ink, and two small tubes 31 and 32 made of similar material. The tube 30 is flattened throughout its length as can be seen from Figs. 3 and 4, and is reduced in size at the ends to receive the tubes 31 and 32, which may be secured in place by soldering. The small tube 31 is threaded at the end for connection with the ball retainer 17.

These ink cartridges may be sold separately as a replacement item, filled with ink and with the ends closed by suitable plugs or caps. When the cartridge supplied with the pen becomes exhausted of ink the barrel 10 is unscrewed from the housing 11, exposing the ink cartridge, which is removed by unscrewing it from the ball retainer 17. The cap at the threaded end of a new cartridge is then removed and the cartridge is screwed into the ball retainer, after which the cap or plug can be removed from the other end of the cartridge. The operation is completed by screwing the barrel 10 on to the housing 11.

If the pen with the replacement ink cartridge should fail to write or should stop writing after a short period, the trouble will be due to an air bubble in the ball retainer, and is easily cured by blowing through the vent at the end of the barrel, which forces out the air past the ball 18. It will be noted in this connection that due to the provision of the groove 28 in the lip 26 at the tip of the ball retainer the ball cannot act as a valve to prevent the escape of the air.

The operation of the pen will be readily understood from the foregoing, and will require no extended description. When the pen is in use for writing, the ball 18 rotates in its seat, as mentioned hereinbefore, and continuously transfers ink from the ink channel 23 to the paper or other material which is being written upon. As the ink is removed from channel 23 it is supplied from the ink cartridge due to atmospheric pressure acting through tube 32, which keeps channel 23 and the space around the ball in its recess full until the ink becomes exhausted.

When the pen is carried in the pocket, with the point uppermost, or is laid on its side, the ink does not run back into the cartridge but due to capillary action it is retained and the ink channels remain full, ready to resume writing at any time.

The invention having been described that which is believed to be new and for which the protection of Letters Patent is desired will be pointed out in the appended claims.

I claim:

1. In a fountain pen, a metallic tip having a ball retaining recess therein, a ball in said recess, a lip of reduced diameter at the outer end of said recess to prevent escape of the ball, and a groove intersecting said lip at a point where the lip is engaged by the ball when the pen is in writing position.

2. In a fountain pen, a tubular barrel having the writing end formed to lie in a plane which is substantially parallel to the writing surface when the pen is held in an inclined writing position, a ball retainer comprising a cylindrical section enclosed in said barrel and a substantially conical section projecting therefrom along an axis inclined to the longitudinal axis of said cylindrical section, the base of said conical section being disposed substantially in said plane, a circular ball retaining lip at the smaller end of said conical section, said lip defining a plane to which the axis of the conical section is perpendicular, a ball seat formed in said conical section, a writing ball retained in said seat by said lip, and intersecting ink channels in said sections for conveying ink to said ball.

3. In a ball point fountain pen, a ball retainer comprising a cylindrical metal body, a substantially conical tip formed at one end of said body, the central axis of said conical tip being inclined to the longitudinal axis of said body at an angle of about 8 degrees, a circular ball retaining lip at the end of said tip, said lip defining a plane to which the axis of said tip is perpendicular, a recess behind said lip having a seat for a ball, a writing ball retained in said recess by said lip, said ball being laterally offset from the longitudinal axis of said body, and ink channels extending through said body and tip to convey ink to said ball.

4. A fountain pen as claimed in claim 3, wherein the location of the conical tip along its axis is such that its longest slant height is below the ball when the pen is in writing position and is not less than 50% longer than its shortest slant height.

5. In a ball point fountain pen, a ball retainer comprising a straight section of metallic rod, an ink channel extending from one end of said rod to a point near the other end, a symmetrically tapering tip formed from said rod at the said other end thereof on an axis which is inclined to the longitudinal axis of said rod by a small angle, an ink channel in said tip drilled along the axis thereof to meet said first mentioned ink channel, a ball inclosing recess formed at the end of said tip and terminating in a circular lip of uniform thickness defining a plane to which the axis of the tip is perpendicular, and a ball in said recess retained therein by said lip.

6. A fountain pen as claimed in claim 5, comprising a pen barrel enclosing the ball retainer except for the tapered tip formed at the end thereof, the said tip projecting from said barrel, and the end of the barrel being formed to make an angle with the body thereof which is substantially the same as the angle between the junction of the tip and rod and the body of the rod.

THOMAS B. GIBBS.

REFERENCES CITED

The following references are of record in the file of this patent:

UNITED STATES PATENTS

| Number | Name | Date |
|---|---|---|
| 555,763 | Fessenden | Mar. 3, 1896 |
| 1,409,037 | Starkey et al. | Mar. 7, 1922 |
| 1,514,519 | Harris | Nov. 4, 1924 |
| 1,964,512 | Halpern | June 26, 1934 |
| 2,390,636 | Biro | Dec. 11, 1945 |
| 2,397,229 | Biro | Mar. 26, 1946 |
| 2,416,896 | Biro | Mar. 4, 1947 |
| 2,417,861 | Dahlberg | Mar. 25, 1947 |

FOREIGN PATENTS

| Number | Country | Date |
|---|---|---|
| 3,136 of 1888 | Great Britain | Mar. 1, 1888 |
| 800,851 | France | 1936 |